(12) United States Patent
Edwards et al.

(10) Patent No.: US 11,496,301 B2
(45) Date of Patent: Nov. 8, 2022

(54) PUBLISH/SUBSCRIBE MESSAGING

(71) Applicant: International Business Machines Corporation, Armonk, NY (US)

(72) Inventors: Ian Charles Edwards, Southampton (GB); Jonathan Levell, Hampshire (GB); Bernard Zdzislaw Kufluk, Whitchurch (GB)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 16/796,975

(22) Filed: Feb. 21, 2020

(65) Prior Publication Data
US 2021/0266160 A1 Aug. 26, 2021

(51) Int. Cl.
*H04L 9/08* (2006.01)
*H04L 9/32* (2006.01)
(Continued)

(52) U.S. Cl.
CPC ............ *H04L 9/0891* (2013.01); *H04L 9/085* (2013.01); *H04L 9/0819* (2013.01);
(Continued)

(58) Field of Classification Search
CPC . H04L 63/065; H04L 63/0428; H04L 63/062; H04L 63/04; H04L 63/0435;
(Continued)

(56) References Cited

U.S. PATENT DOCUMENTS 9,106,413 B2   8/2015 Kim et al.
9,161,216 B2 * 10/2015 Jung ..................... H04L 63/065
(Continued)

FOREIGN PATENT DOCUMENTS

WO       20162005951 W    12/2016
WO    WO-2016200595 A1 * 12/2016 ......... H04L 63/0435
WO       2021165100 A1    8/2021

OTHER PUBLICATIONS

"Patent Cooperation Treaty PCT Notification of Transmittal of the International Search Report and the Written Opinion of the International Searching Authority, or the Declaration", Applicant's file reference P201809333, International application No. PCT/EP2021/053081, International filing date Feb. 9, 2021, dated May 14, 2021, 12 pages.

(Continued)

*Primary Examiner* — Tae K Kim
(74) *Attorney, Agent, or Firm* — Gilbert Harmon, Jr.; Nicholas Cadmus; Maeve M. Carpenter (57) ABSTRACT

Some embodiments of the present invention comprise a method, system, and/or computer program product for a publish/subscribe messaging system. A processor identifies a subscriber of a pub/sub messaging system. The processor retrieves a stored encrypted key for the identified subscriber of the pub/sub messaging system. The processor communicates the retrieved encrypted key to a user selected from a group comprising a publisher of the pub/sub messaging system and the identified subscriber of the pub/sub messaging system. The processor implements end-to-end encryption of messages of the pub/sub messaging system based on key-groups.

23 Claims, 4 Drawing Sheets

(51) Int. Cl.
 H04L 12/28 (2006.01)
 H04L 41/00 (2022.01)
 H04L 67/303 (2022.01)
 H04L 67/55 (2022.01)
(52) U.S. Cl.
 CPC ........ *H04L 9/3263* (2013.01); *H04L 12/2859* (2013.01); *H04L 12/2874* (2013.01); *H04L 41/20* (2013.01); *H04L 67/303* (2013.01); *H04L 67/55* (2022.05)
(58) Field of Classification Search
 CPC ..... H04L 63/06; H04L 9/0833; H04L 9/0891; H04L 9/0825; H04L 9/0822; H04L 9/0894; H04L 9/0819; H04L 9/0861; H04L 9/08; H04L 9/32; H04L 9/321; H04L 67/26; H04L 67/1063; H04L 12/18; H04L 2463/061
 See application file for complete search history.

(56) References Cited

U.S. PATENT DOCUMENTS

| | | | | |
|---|---|---|---|---|
| 11,201,733 B2* | 12/2021 | Fries | ............ | H04L 63/065 |
| 2009/0150668 A1* | 6/2009 | Liu | ............ | H04L 9/0833 |
| | | | | 380/281 |
| 2010/0040236 A1* | 2/2010 | Xu | ............ | H04L 9/0841 |
| | | | | 380/46 |
| 2011/0188655 A1* | 8/2011 | Moreillon | ............ | H04L 9/0891 |
| | | | | 380/255 |
| 2012/0257756 A1* | 10/2012 | Huang | ............ | H04L 9/0836 |
| | | | | 380/281 |
| 2012/0266209 A1* | 10/2012 | Gooding | ............ | H04L 63/20 |
| | | | | 726/1 |
| 2012/0317655 A1* | 12/2012 | Zhang | ............ | H04L 9/0833 |
| | | | | 726/28 |
| 2014/0129838 A1* | 5/2014 | Kim | ............ | H04L 63/0807 |
| | | | | 713/171 |
| 2016/0301695 A1 | 10/2016 | Trivelpiece et al. | | |
| 2016/0366111 A1 | 12/2016 | Smith et al. | | |
| 2017/0155628 A1 | 6/2017 | Rohloff et al. | | |
| 2017/0180122 A1 | 6/2017 | Smith et al. | | |
| 2018/0254892 A1* | 9/2018 | Egorov | ............ | H04L 9/0891 |
| 2020/0059357 A1* | 2/2020 | Fries | ............ | H04L 9/0861 |
| 2020/0366658 A1* | 11/2020 | Bang | ............ | H04L 9/14 |
| 2021/0050996 A1* | 2/2021 | Fries | ............ | H04L 9/30 |

OTHER PUBLICATIONS

Li et al., "Batch Rekeying for Secure Group Communications", Proceedings of the 10th international conference on Norld Wide Web, May 1-5, 2001, Hong Kong, 10 pages, http://dl.acm.org/citation.cfm?id=372153>.

Liebau, Sonke, "KIP-317: Add end-to-end data encryption functionality to Apache", Last Modified on Aug. 6, 2019, 10 pages, <https://cwiki.apache.org/confluence/display/KAFKA/KIP-317%3A+Add+end-to-end+data+encryption+functionality+to+Apache+Kafka>.

Wong et al., "Secure Group Communications Using Key Graphs", IEEE/ACM Transactions on Networking, vol. 8, No. 1, Feb. 2000, 15 pages, http://people.cs.georgetown.edu/~clay/classes/spring2009/555/papers/WGL-keydist.pdf>.

* cited by examiner

PUBLISH/SUBSCRIBE MESSAGING

BACKGROUND

The present invention relates generally to the field of publish/subscribe messaging (typically referred to as pub/sub messaging), and in particular to middleware for a pub/sub messaging system.

Messaging systems are common and widely used. Conventional examples range from social media applications to large financial messaging systems that conduct, for example, inter-bank and intra-bank financial transfers using messaging middleware.

Middleware is software that lies between a computer operating system and software applications. Middleware comprises functions that can be registered against routes in an application. These middleware functions are able to execute code, alter requests and/or response objects, and end a request-response cycle. Once a function of the middleware is completed, the middleware typically calls a route handler function. The route handler function, which can be another middleware, receives the altered request and/or response object as an input from the middleware. Third parties can implement custom middleware to add functionality, such as authentication and sessions, to their applications.

Some messaging systems provide "end-to-end" encryption wherein sending applications encrypt messages before transmission in such a way that they can only be decrypted by the intended recipient. If the messaging system is compromised in some way, for example a malicious third party gains access to the encrypted messages, the third party is unable to decrypt the messages to recover the content encoded therein.

SUMMARY

According to an aspect of the present invention, there is a method, computer program product and/or system for a publish/subscribe (pub/sub) messaging system that performs the following operations (not necessarily in the following order): (i) identifying a subscriber of a pub/sub messaging system; (ii) retrieving a stored encrypted key for the identified subscriber of the pub/sub messaging system; (iii) communicating the retrieved encrypted key to a user selected from a group comprising a publisher of the pub/sub messaging system and the identified subscriber of the pub/sub messaging system; and (iv) implementing end-to-end encryption of messages of the pub/sub messaging system based on key-groups.

According to a further aspect of the present invention, there is a method, computer program product and/or system for a publish/subscribe (pub/sub) messaging system that performs the following operations (not necessarily in the following order): (i) identifying, by a middleware system, a subscriber of the pub/sub messaging system; (ii) retrieving, by the middleware system, a stored encrypted key for the identified subscriber of the pub/sub messaging system; (iii) communicating, by the middleware system, the retrieved encrypted key to a user selected from a group comprising a publisher of the pub/sub messaging system and the identified subscriber of the pub/sub messaging system; and (iv) implementing, by the middleware system, end-to-end encryption of messages of the messaging system based on key-groups.

According to a further aspect of the present invention, there is a method, computer program product and/or system for a publish/subscribe (pub/sub) messaging system that performs the following operations (not necessarily in the following order): (i) identifying, by a key management system, a subscriber of the pub/sub messaging system; (ii) retrieving, by the key management system, from a key storage component, an encrypted key for the identified subscriber of the pub/sub messaging system; (iii) communicating, by the key management system, the retrieved encrypted key to a user selected from the group consisting of a publisher of the pub/sub messaging system and the identified subscriber of the pub/sub messaging system; and (iv) implementing, by the key management system, end-to-end encryption of messages of the messaging system based on key-groups.

DETAILED DESCRIPTION

This Detailed Description section is divided into the following sub-sections: (i) The Hardware and Software Environment; (ii) Comments and/or Embodiments; and (iii) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

II. Comments and/or Embodiments

Some embodiments of the present invention may recognize one, or more, of the following facts, potential problems, and/or potential areas for improvement with respect to the current state of the art. In some publish/subscribe (pub/sub) messaging systems, the publishing application and the subscribing application are decoupled (that is, they operate independently of one another). The messaging system contains one or more brokers that (i) receive requests to subscribe to certain messages, and (ii) match incoming messages from publishers to authorized subscribers who want to receive the messages. Some publishing applications do not track subscriber lists or changes to thereto. Brokering (matching and distribution) of messages is therefore offloaded to the pub/sub messaging system, thereby allowing applications that produce (send) and consume (receive) messages (via the pub/sub messaging system) to be simpler. However, end-to-end encryption may not work efficiently with pub/sub messaging models.

Some embodiments of the present invention implement middleware for a pub/sub messaging system to facilitate end-to-end encryption while working efficiently with a pub/sub messaging model that is scalable to a very large number of subscribers. Some embodiments are implemented in conjunction with wide fan-out pub/sub messaging systems.

In particular, some embodiments improve middleware implementation in a pub/sub messaging system to facilitate group key distribution. In a cryptographic setting, a group key may be sent to members of a group. The key allows the members of the group, and only the members, to decrypt a message that is broadcast to the group.

Some embodiments leverage advantages associated with implementing "key groups", namely by dividing subscribers into groups and assigning a key (for example, password, code, authentication tag, etc.) to each group.

Consider a scenario where one wishes to send a message to a large number of subscribers. In some embodiments, a system divides the subscribers into (for example) $1^{st}$ level groups (for example, $1^{st}$ level groups of three), and assigns a key to each $1^{st}$ level group. The system groups those $1^{st}$ level groups into $2^{nd}$ level groups of three $1^{st}$ level groups, and assigns a key to each $2^{nd}$ level group. Some embodiments, have several levels of nested groups beyond $1^{st}$ and $2^{nd}$ levels. The system repeats this multi-level grouping of groups, and assignment of a respective key at each level, resulting in a "tree" of multiple levels of groups with passwords (called "key groups"). At the base of the tree, there is one key (that is, a common key) that every subscriber "knows". The system sends the message using this common key.

If one of the subscribers is no longer authorized, then, instead of sending a new key to every other existing subscriber, fewer messages can be sent because the keys that are unaffected by the newly-unauthorized subscriber can be reused/maintained. For example, if there are one million subscribers and groupings of four are employed, 1,333,337 keys (one for each node in the tree) will be issued. The advantage, however, is that if one of the subscribers is no longer authorized, instead of sending 999,999 new passwords, only approximately 40 new keys need to be issued.

In some embodiments of the present invention, a pub/sub messaging middleware system comprises a key management component that facilitates the use of key-groups, thereby making such systems easier to develop and more efficient. In some embodiments, such a messaging middleware facilitates group key distribution and end-to-end encryption in a pub/sub style messaging model.

A system in accordance with some embodiments of the present invention provides facilities which: (i) assist with the assignment of subscribers to groups for session keys; (ii) provide store/forward functionality for message distribution; (iii) provide network offload functionality for message distribution; and (iv) store and replay encrypted auxiliary keys for subscribers with no loss of security.

If an attacker gains access to the messaging middleware (but not the trusted certificate authorities), the attacker may be able to disrupt the transmission of messages (for example, via a denial of service attack). The attacker may further obtain metadata about which users are publishing/subscribing and on which topics. However, the attacker will not be able to access the content of the messages being transmitted. In cases where message receipt is acknowledged by receivers, a denial of service attack will be detectable.

In some embodiments, a middleware system for a pub/sub messaging system includes a key management component that is configured to facilitate end-to-end encryption of messages of the messaging system based on key-groups. The middleware system may thus implement end-to-end encryption in a pub/sub messaging system. In some embodiments, such end-to-end encryption using key groups is layered on top of a topic-based pub/sub model.

In particular, in some embodiments, a component or system performs some or all of:

(i) Suggests assignments of subscribers to key groups (in some embodiments, using heuristics based on factors such as durability of subscriptions);

(ii) Stores and replays encrypted auxiliary keys for subscribers with no loss of security;

(iii) Checks certificate chains of publishers and subscribers before passing messages onwards. Applications would have to re-perform checks on applications that the middleware authorized in case the middleware was compromised but could mitigate Denial of Service attacks in other cases;

(iv) Warning the publisher if it had not notified all valid subscribers with new keys during a rekeying.

In some embodiments, the key management component of the middleware system may comprise an encryption facilitator (EF) component configured to communicate with publishers and subscribers of the pub/sub messaging system and to subscribe to topics based on communications from publishers and subscribers of the pub/sub messaging system In an example embodiment, the key management component of the middleware system may comprise a grouping component configured to identify a key-group for a subscriber of the pub/sub messaging system based on one or more heuristics of the pub/sub messaging system. By way of example, the one or more heuristics of the pub/sub messaging system are based on factors such as: a subscription persistence; a lifetime of an existing subscription; and a lifetime of a previous subscription.

In some embodiments, the key management component may comprise a key storage component configured to store an encrypted key for a subscriber of the pub/sub messaging system. The key management component may then be configured to retrieve an encrypted key from the key storage component and communicate the retrieved encrypted key to publisher or subscriber of the pub/sub messaging system.

The key management component of some embodiments may further comprise a validation component configured to validate a certification chain of a publisher or subscriber of the pub/sub messaging system.

The key management component of some embodiments may further comprise a notification component configured to notify a publisher of the pub/sub messaging system that one or more subscribers of the pub/sub messaging system have not been supplied with new keys during a re-keying procedure.

The key management component may be configured to, responsive to un-subscription of a first subscriber of the pub/sub messaging system not causing a re-keying procedure, track certificates of ex-subscribers that un-subscribed since the most recent re-keying procedure was undertaken and initiate a re-keying procedure if the first subscriber becomes unauthorized.

Embodiments may therefore provide concepts for implementing end-to-end encryption of messages of a pub/sub messaging system, and such implementation may employ key-groups.

Figure 1:
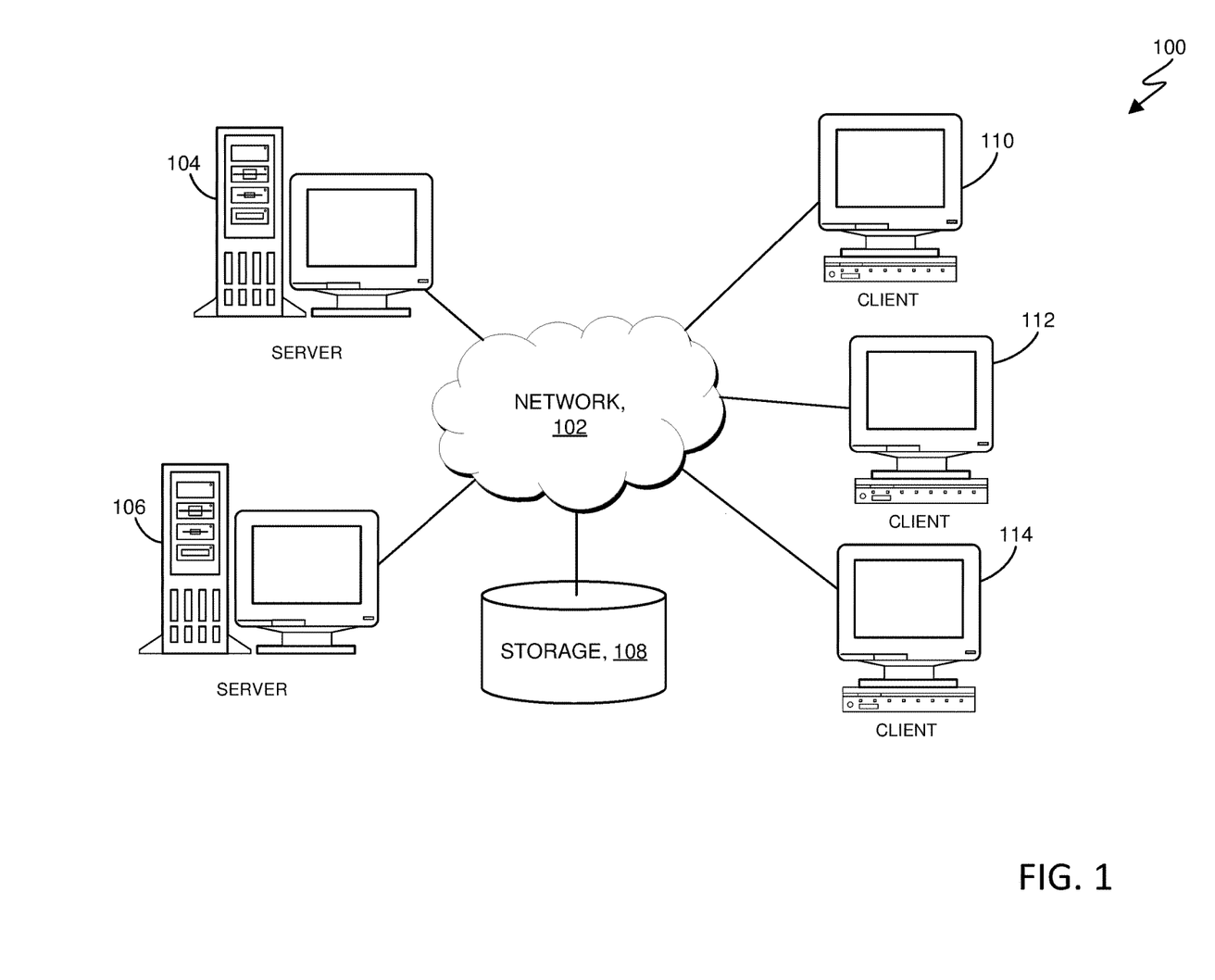
FIG. 1 is a pictorial representation of a distributed system in accordance with at least one embodiment of the present invention.

FIG. 1 is a pictorial representation of a distributed system in which aspects of the illustrative embodiments of the present invention may be implemented. Distributed system 100 may include a network of computers in which aspects of the illustrative embodiments may be implemented. Distributed system 100 contains at least one network 102, which is the medium used to provide communication links between various devices and computers connected together within the distributed data processing system 100. Network 102 may include connections, such as wire, wireless communication links, or fiber optic cables.

In the depicted example, first server 104 and second server 106 are connected to network 102 along with a storage unit 108. In addition, clients 110, 112, and 114 are also connected to network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Those of ordinary skill in the art will appreciate that the hardware in FIG. 1 may vary depending on the implementation. Also, the processes of the illustrative embodiments may be applied to a multiprocessor data processing system, other than the system mentioned previously, without departing from the scope of the present invention.

Moreover, embodiments may take the form of any of a number of different data processing systems including client computing devices, server computing devices, a tablet computer, laptop computer, telephone or other communication device, a personal digital assistant (PDA), or the like. In some illustrative examples, a system according to an embodiment may be a portable computing device that is configured with flash memory to provide non-volatile memory for storing operating system files and/or user-generated data, for example. Thus, a data processing system in accordance with some embodiments, may be any known or later-developed data processing system without architectural limitation.

As detailed above, some embodiments comprise a method and middleware system for pub/sub messaging wherein end-to-end encryption of messages is implemented based on key-groups. By way of further explanation, an example embodiment of such a system will now be described with reference to FIG. 2.

Figure 2:
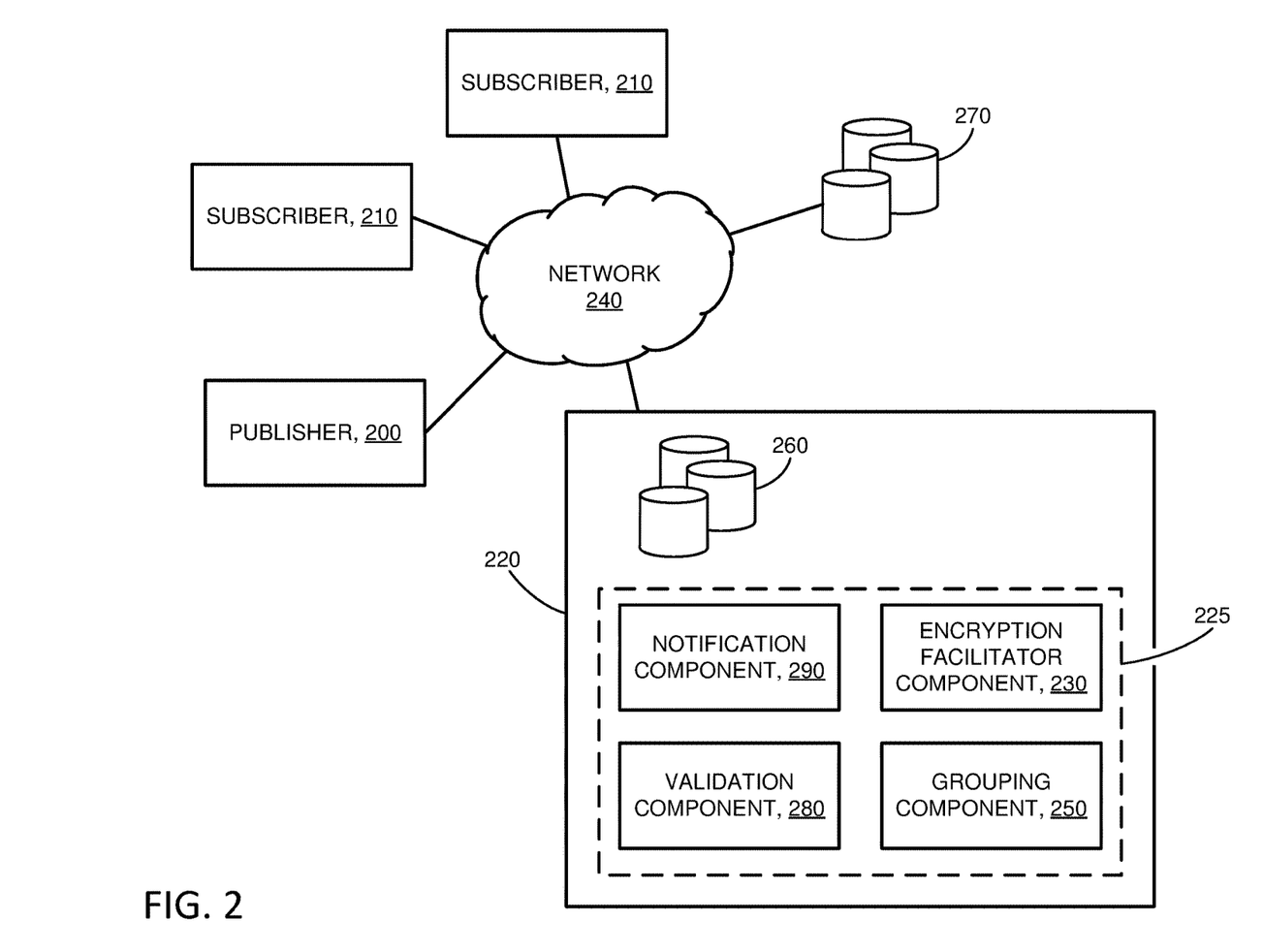
FIG. 2 is a schematic diagram of a distributed publish/subscribe messaging system in accordance with at least one embodiment of the present invention.

Referring to FIG. 2, there is depicted a schematic diagram of a distributed pub/sub messaging system in accordance with some embodiments of the present invention. The distributed pub/sub messaging system includes a publisher 200, a plurality of subscribers 210 and a middleware system 220.

Middleware system 220 comprises a key management component 225 that is configured to implement end-to-end encryption of messages of the messaging system based on key-groups. In particular, the key management component 225 comprises an encryption facilitator 230 component configured to communicate with publisher 200 and subscribers 210 of the pub/sub messaging system via communication network 240 (for example, the Internet) and to subscribe to topics based on communications from publisher 200 and subscribers 210.

Key management component 225 comprises a grouping component 250 that is configured to identify a key-group for a subscriber of the pub/sub messaging system based on one or more heuristics of the pub/sub messaging system. By way of example, heuristics of the pub/sub messaging system comprise: a subscription persistence; a lifetime of an existing subscription; and a lifetime of a previous subscription.

The middleware system also comprises a key storage component 260. The key storage component 260 is configured to store an encrypted key for a subscriber 210 of the pub/sub messaging system. Although the example of FIG. 2 depicts the key storage component 260 as being included in the middleware system 220, all or part of the key storage component 260 may be implemented using a remotely located data storage unit 270 that is accessible via the communication network 240. In this way, local data storage requirements of the middleware system 220 may be alleviated/reduced (for example, by making use of remote/separate data storage facilities such as the remotely located data storage unit 270).

The key management component 225 is configured to retrieve an encrypted key from the key storage component 260 and communicate the retrieved encrypted key to the publisher 200 or a subscriber 210 of the pub/sub messaging system.

The key management component 225 of this example embodiment also comprises a validation component 280 that is configured to validate a certification chain of a publisher or subscriber of the pub/sub messaging system. Further, the key management component 225 also comprises a notification component 290 that is configured to notify the publisher 200 that one or more subscribers 210 have not been supplied with new keys during a re-keying procedure.

The key management component 225 is configured to, responsive to the unsubscribing of a first subscriber 210 not causing a re-keying procedure, track certificates of ex-subscribers that un-subscribed since the most recent re-keying procedure was undertaken and initiate a re-keying procedure if the first subscriber becomes unauthorized.

Figure 3A:
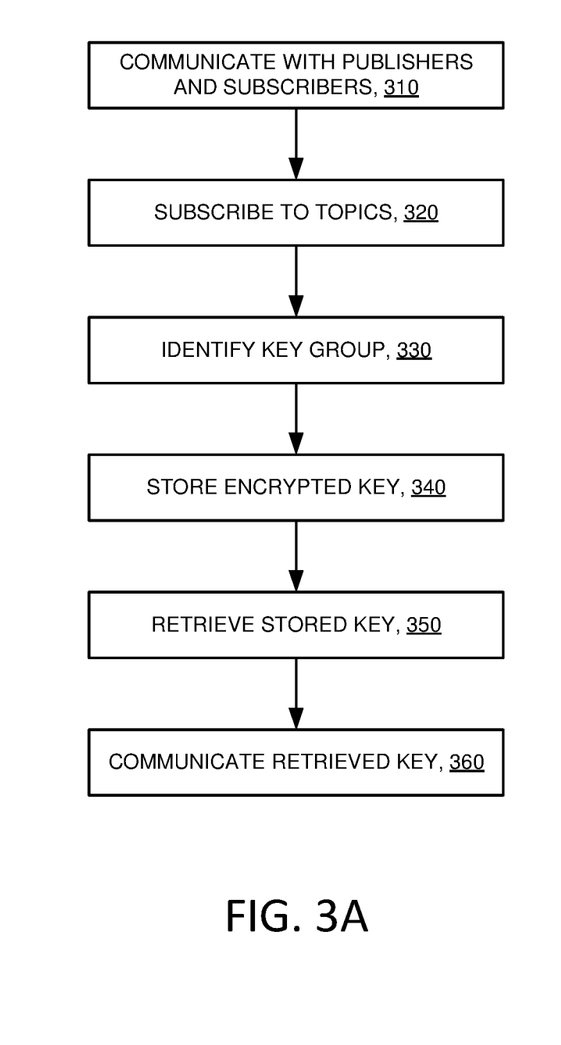
FIG. 3A is a simplified flow diagram of a computer-implemented method for a publish/subscribe messaging system in accordance with at least one embodiment of the present invention.

Referring to FIG. 3A, there is depicted a simplified flow diagram of a computer-implemented method for a publish/subscribe (pub/sub) messaging system in accordance with some embodiments of the present invention. The method is configured for implementing end-to-end encryption of messages of the pub/sub messaging system based on key-groups.

Operation 310 comprises the encryption facilitator component communicating with publishers and subscribers of the pub/sub messaging system (e.g. via a distributed communication network).

Based on communications the publishers and subscribers, the encryption facilitator component subscribes to topics in operation 320 based on communications from publishers and subscribers of the pub/sub messaging system. In this way, a new subscriber subscribes to the topic(s) of interest in the messaging middleware, and the new subscriber then prepares to receive out-of-band messages from the publisher/encryption facilitator (if necessary). By way of example, the subscriber may notify the encryption facilitator of their existence by publishing a message.

In operation 330, a grouping component identifies a key-group for a subscriber of the pub/sub messaging system based on a heuristic of the pub/sub messaging system. By way of example, heuristics of the pub/sub messaging system comprise: a subscription persistence; a lifetime of an existing subscription; and a lifetime of a previous subscription. In particular, a heuristic may be based on a durability of a subscription, thus accounting for the consideration that durable subscriptions are likely to last longer. Another heuristic may be based on a claimed lifetime by the subscriber (e.g. a notification to the encryption facilitator may be extended to include an estimated lifetime). Yet another heuristic may be based on past subscription lifetimes of the subscribing client (or similar classes of client).

Operation 340 comprises storing an encrypted key for the subscriber of the pub/sub messaging system. In particular, a publisher checks a certificate of the subscriber and, if valid, completes negotiation of a shared secret with the new subscriber, settles on an assignment to key groups and generates auxiliary keys. The Encryption Facilitator then stores these encrypted keys (using a storage component of the middleware system) for future use.

The complete set of keys is then published back to the subscriber and, because only the subscriber has access to the private key involved in the key negotiation with the publisher, only the subscriber can decrypt the chain of keys.

For a particular subscriber of the pub/sub messaging system, the key management component retrieves a stored key from the key storage component in operation 350. The middleware key management component then communicates the retrieved encrypted key in operation 360. In embodiments, the complete set of keys may be published back to the subscriber and, because only the subscriber has access to the private key involved in the key negotiation with the publisher, only the subscriber can decrypt the chain of keys.

The publisher can then publish messages to the topic encrypted with the "top-level" auxiliary key that all subscribers have access to.

Re-keying involves a publisher sending auxiliary keys to nodes that have been affected by changes in the group membership. For instance, it may be necessary to update the keys used for a number of reasons, such as: (i) A new subscriber arrives; and (ii) A subscriber un-subscribes.

Figure 3B:
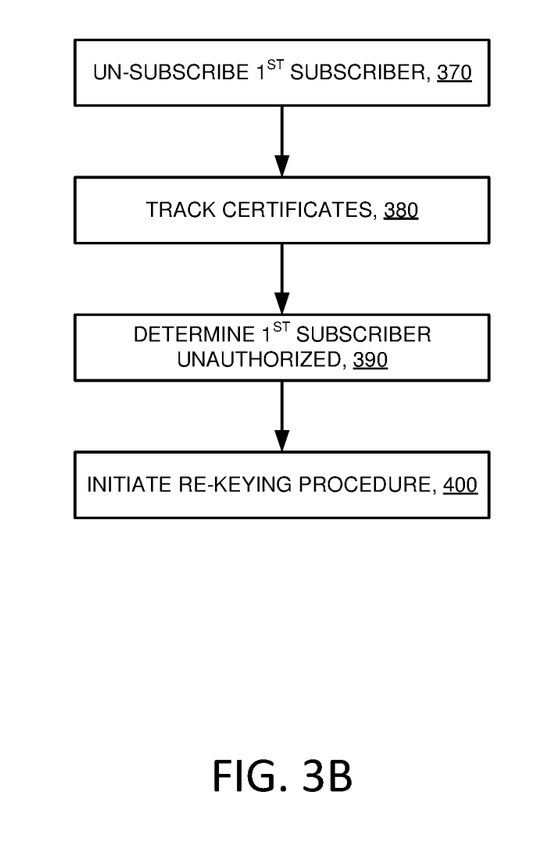
FIG. 3B is a simplified flow diagram of a method for un-subscribing a first subscriber of a pub/sub messaging system in accordance with at least one embodiment of the present invention.
Figure 4:
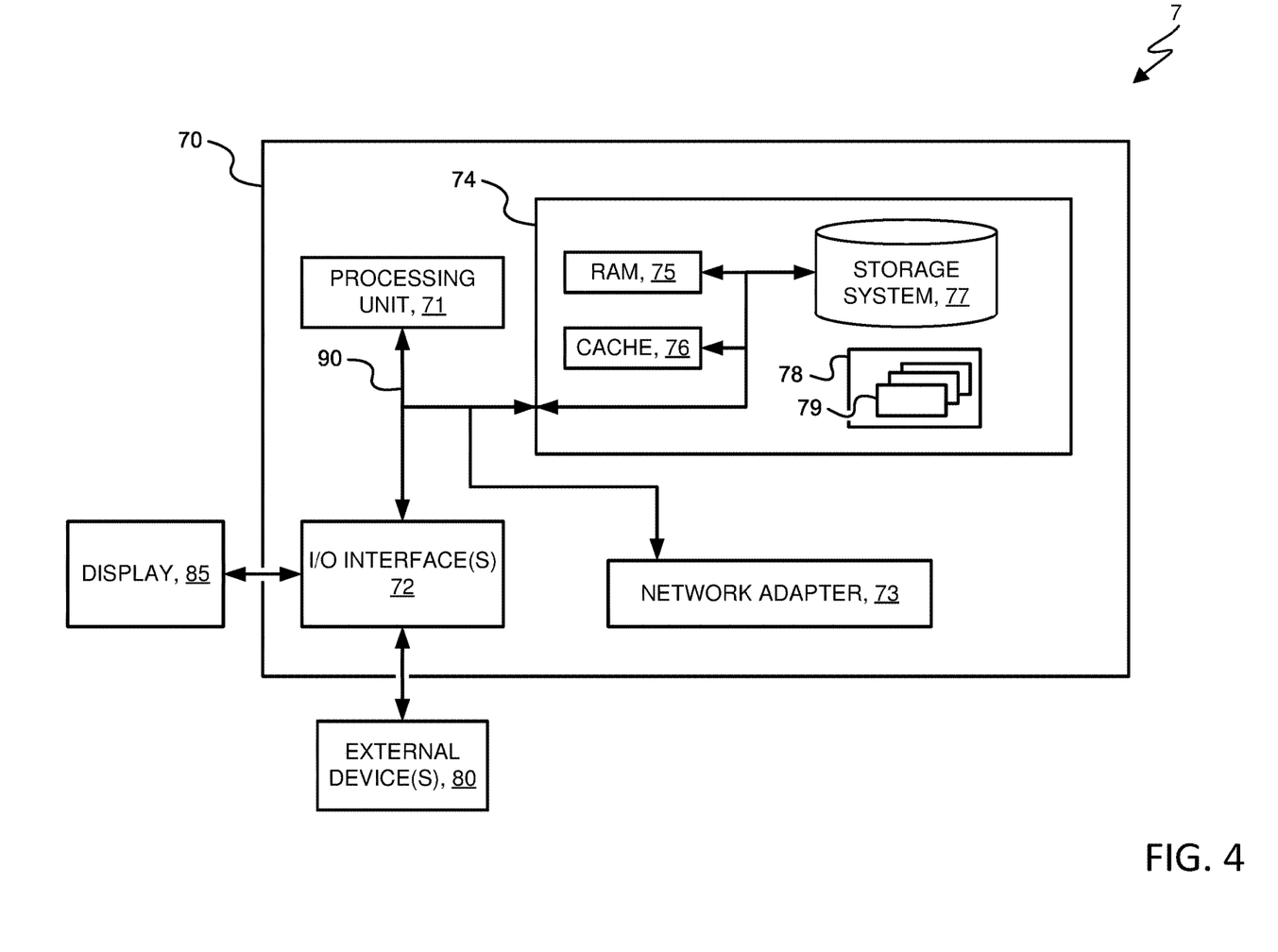
FIG. 4 illustrates a system in accordance with at least one embodiment of the present invention.

Referring to FIG. 3B, there is depicted a flow diagram of a computer-implemented method for un-subscribing a first subscriber of a pub/sub messaging system that does not cause a re-keying procedure. Such a method may be implemented in conjunction with the method of FIG. 3A.

The method begins in operation 370 with detecting/identifying an un-subscription of a first subscriber of a pub/sub messaging system not causing a re-keying procedure. Responsive to detecting such an occurrence, the method proceeds to operation 380.

Operation 380 comprises tracking certificates of ex-subscribers that un-subscribed since a most recent first re-keying procedure was undertaken. Operation 390 then comprises determining that the first subscriber has become unauthorized. In response to determining that the first subscriber has become unauthorized, the method then proceeds to operation 400 of initiating a re-keying procedure.

The above method described with reference to FIG. 3B may be implemented to ensure that re-keying take places in response to a subscriber un-subscribing. This may, for example, be advantageous for implementations wherein it is inappropriate for subscribers to have a key that allows them to decrypt messages after un-subscribing.

Further concepts of a middleware system in accordance with at least one embodiment of present invention, are described below. The following terms and their associated meanings are detailed as follows:

Certificate Authority (CA)—Need to be trusted. An attacker compromising these would allow them to authenticate as a valid subscriber. A CA signs certificates proving that publishers and subscribers are who they claim to be (and those certificates can be used to send encrypted messages);

Messaging middleware—Allow publishers and subscribers to connect to them—publishers send messages to these brokers and the middleware passes the messages on to subscribers who are interested in those messages;

Encryption Facilitator (EF)—a module built into the messaging middleware or a separate entity. Provides key group functionality in accordance with some embodiments;

Publisher—Trust (a subset of) CAs to issue and revoke certificates to subscribers Subscriber—Can trust (a subset of) CAs to issue and revoke certificates to publishers or be prepared to trust "uncertified" publishers;

Signature Key—Public/private key pair that is issued a certificate signed by a trusted CA. In a system that implements forward secrecy, these are used to sign new temporary "ephemeral keys". In an older style system, these are used instead of ephemeral keys as part of the key agreement negotiation. In a forward secrecy system, an attacker that obtained the private key of a signature key pair could create new trusted ephemeral keys and therefore intercept and decrypt future traffic, but not decrypt older messages without the private key for previous ephemeral keys;

Ephemeral Key—Temporary key pair signed by the signature key. An attacker who obtains the private key from an ephemeral key pair may be able to decrypt previously stored messages that used that ephemeral key pair, but not create new trusted ephemeral key pairs or decrypt messages sent using other ephemeral keys; and Auxiliary Key—Keys (for example, passwords) for symmetric ciphers assigned to each of the nodes in the key group tree;

Key Groups and their names:

To send encrypted messages to 1,000,000 subscribers, one assigns those subscribers into groups (for example, groups of four). One then groups those groups into groups (of four) again. This group of groups is repeated so as to build a tree with (for example, 1,000,000) leaf nodes (labelled $G\_0\_1 \ldots G\_0\_1000000$, respectively). Below the leaves, 250,000 nodes each represent a group of 4 subscribers (labelled $G\_1\_1$ to $G\_1\_250000$). One then ends up with $G\_8\_1 \ldots G\_8\_16$ and so on up to $G\_10\_1$ (the number of levels in the tree grows logarithmically with the number of subscribers).

$G\_0\_1$ to $G\_0\_4$ are then provided with a key to a symmetric cipher (such as AES-256, for example) for the group $G\_1\_1$ and so on, so each group of four subscribers has a shared key. This is then repeated for $G\_1\_1$ to $G\_1\_4$, and then for $G\_2\_1$, etc.

Thus, instead of 1,000,000 keys (that is, 1 for each subscriber), this approach ends up with 1,333,337 keys (one for each node in the tree).

An advantage of this key grouping approach is that, if one of the subscribers is no longer authorized, instead of sending 999,999 new password messages, only approximately 40 new password messages need to be communicated.

For example, if $G\_0\_1$ became unauthorized, it would be required to issue:

A new password for $G\_1\_1$ (sent to $G\_0\_2$, $G\_0\_3$ and $G\_0\_4$);

A new password for $G\_2\_1$ (sent using the new password to $G\_1\_1$ and using the existing passwords to $G\_1\_2$, $G\_1\_3$ and $G\_1\_4$);

... ; and

A new password for $G\_10\_1$ (sent using the new password to $G\_9\_1$ and using the existing passwords to $G\_9\_2$, $G\_9\_3$ and $G\_9\_4$).

This is approximately 4 password messages per level, for 10 levels, or approximately 40 password messages.

Accordingly, for the cost of extra complexity and an approximately 33% increase in the number of stored symmetric keys (1,333,337 compared to 1,000,000 for a conventional approach), some embodiments provide a significant saving (reduction) in network traffic when new keys are needed.

Initial Setup

If the encryption facility (EF) is a module separate from the messaging middleware, the EF may communicate with publishers and subscribers on the messaging middleware using a special set of topics. For this, the EF subscribes to those topics, for example, subscribe to "/secret/#" where # is a wildcard that means any text matches.

NEW SUBSCRIBER—Subscribers subscribing before messages are published:

(i) The new subscriber subscribes to the topic(s) of interest in the messaging middleware, for example, /topic/secretmessages/.

(ii) The new subscriber prepares to receive out-of-band messages from the publisher/EF (if necessary) for example, by subscribing to /e2esub/<clientid>/#.

(iii) The new subscriber notifies the EF of their existence by, for example, publishing a message on /secret/newsubscriber/<clientid>/<topic>.

A New Set of Messages to be Published (i) The publisher prepares to receive messages from the EF (if necessary) for example, by subscribing to /e2epub/<clientid>/#.

(ii) The publisher notifies the EF that it intends to publish a new stream of messages on a topic for example, publishing to: /secret/newpublisher/<clientid>/<streamid>/<topic>.

This may include a CA-signed cert so the subscribers can verify a valid publisher.

(iii) The EF requests matching subscribers to supply new ephemeral public key with a valid chain to a CA for example, by publishing a special format message to: /topic/secretmessages/ (in some embodiments, containing the certificate supplied by the publisher).

(iv) Subscribers supply ephemeral public key (and chain to CA) and any details required to negotiate a shared secret by, for example, publishing to: /secret/subcreds/<clientid of subscriber>/<streamid>.

(v) In some embodiments, for each subscriber for whom the EF has a credential for the stream, the EF can suggest assignments to groups. In some embodiments (for example, where subscribing and unsubscribing cause rekeying, and/or joins and leaves are batched), it is useful for the EF to suggest key groups based on heuristically determined ephemerality of the respectively corresponding subscriptions. In some embodiments, the heuristic is based on:

(a) Durability of a subscription ("CleanSession" in client server publish/subscribe messaging transport protocol terminology)—durable subscriptions are likely to last longer;

(b) Claimed lifetime by the subscriber—in some embodiments, the notification to the EF is extended to include an estimated lifetime; and (c) Past subscription lifetimes of the subscribing client (or similar classes of client).

(vi) The EF then notifies the publisher about the new subscriber(s), and in some embodiments, suggests key groups by, for example, publishing to: /e2epub/<publisher clientid>/<stream id>/newsub/<subscriber client id>.

(vii) The publisher checks the certificate of the subscriber and, if valid, completes negotiation of a shared secret with the new subscriber, settles on an assignment to key groups and generates auxiliary keys. In some embodiments, the publisher provides a key to the first existing group the EF already knows about. The EF then stores these encrypted keys for future use and replays the remainder of the encrypted keys further up the hierarchy. In some embodiments, the publisher tracks and provides the entire hierarchy of auxiliary keys. In some embodiments, for example, the publisher encrypts a message, that only the new subscriber can read, telling the new subscriber the auxiliary key for keygroup G_1_45 and publishes the message to /secret/<streamid>/subkey/<subscriber client id>.

In some embodiments, the EF then takes this information (and stores it for later replay), adds on the key for the key group that G_1_45 is part of encrypted with the key for G_1_45 (which it has stored from earlier messages from the publisher, because it cannot decrypt this) and so on up the key group hierarchy.

The complete set of keys is then published back to the subscriber and, because only the subscriber has access to the private key involved in the key negotiation with the publisher, only the subscriber can decrypt the chain of keys. So, for example, the chain of keys is published: /e2esub/<subscriber clientid>/<stream id>/keydata (viii) The publisher then publishes messages to the topic encrypted with the "top-level" auxiliary key that all subscribers have access to.

New Subscriber When Messages Have Already Been Published

First the steps (i)-(iii) detailed above for new subscriber are followed. Much like for a new stream of messages, for each stream of publications that is in progress, the EF will request the new subscriber to provide credentials and then, for each stream, the subscriber provides credentials for steps (v)-(viii) as detailed above for the 'new set of messages'.

Rekeying

It may be necessary to update the keys used for a number of reasons:

(A) A new subscriber arrives—In some circumstances it may be inappropriate for subscribers to have access to keys that would let them decrypt messages published before they subscribed.

(B) A subscriber un-subscribes—It may be inappropriate for subscribers to have a key that allows them to decrypt messages after they un-subscribe.

(C) A subscriber has a certificate revoked (for example, the publisher notices the subscriber's certificate on a Certificate Revocation List) in which case a rekeying may be necessary.

Rekeying involves the publisher sending auxiliary keys to nodes that have been affected by changes in the group membership. While the publisher has to generate the new keys, the EF can track who they have been sent to, and if some authorized subscribers have not received new keys, they can (as a debugging aid) notify the publisher.

Subscriber Lost Keys

If using the same ephemeral key, the EF can replay the last keydata. If using a new ephemeral key, publisher has to be notified to provide passwords for the G_1_x level groups then EF could provide remaining passwords From the above description, it will be appreciated that some embodiments may be configured to provide extended functionality in a pub/sub messaging system. Such functionality may be driven by leveraging advantages associated with implementing 'key groups'.

Embodiments leverage a realization that a pub/sub messaging middleware system may be adapted to facilitate the use of key-groups. By facilitating group key distribution and end-to-end encryption in a pub/sub style messaging model, some embodiments support a high degree of scalability.

Embodiments may comprise a computer system 70, which may form part of a networked system 7 illustrated in FIG. 3. For instance, a grouping component according to an embodiment may be implemented in the computer system 70 (for example, as a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of some embodiments. For instance, the memory 74 may include a computer program product having program executable by the processing unit 71 to cause the Input/Output (I/O) interface 72 perform a method for a middleware system of a pub/sub messaging system according to a some embodiment. Program/utility 78, having a set (at least one) of program modules 79, may be stored in memory 74. Program modules 79 generally carry out the functions and/or methodologies for pub/sub messaging systems in accordance with some embodiments of the present invention.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (for example, to communicate with edge devices of a distributed network).

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, that is, may be a computer-implementable method. The various operations of the method may therefore reflect various parts of a computer program, for example, various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention. Further, a component may be an integration flow that is executed by one or more processing units.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

III. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber/publisher: includes, but is not necessarily limited to, the following: (i) a single individual human; (ii) an artificial intelligence entity with sufficient intelligence to act as a user, subscriber and/or publisher; and/or (iii) a group of related users, subscribers, and/or publishers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer-implemented method for a publish/subscribe (pub/sub) messaging system, the method comprising:
   identifying a subscriber of a pub/sub messaging system;
   retrieving a stored encrypted key for the identified subscriber of the pub/sub messaging system;
   communicating the retrieved encrypted key to a user of the pub/sub messaging system;
   implementing end-to-end encryption of messages of the pub/sub messaging system based on key-groups, wherein implementing end-to-end encryption further comprises:
      negotiating a shared secret with the subscriber; and
      generating an encrypted key for the subscriber, based on the shared secret; and
   responsive to an un-subscription of a first subscriber of the pub/sub messaging system where the un-subscription did not cause a re-keying procedure:
      tracking certificates of ex-subscribers that un-subscribed since a most recent first re-keying procedure was undertaken;
      determining that the first subscriber has become unauthorized; and
      in response to determining that the first subscriber has become unauthorized, initiating a second re-keying procedure that is after the most recent first re-keying procedure was undertaken.

2. The method of claim 1, wherein implementing end-to-end encryption further comprises:
   storing the encrypted key for the subscriber of the pub/sub messaging system.

3. The method of claim 1, further comprising:
   identifying a key-group for a subscriber of the pub/sub messaging system based on a heuristic of the pub/sub messaging system.

4. The method of claim 3, wherein the heuristic of the pub/sub messaging system is based on a factor selected from the group consisting of a subscription persistence, a lifetime of an existing subscription, and a lifetime of a previous subscription.

5. The method of claim 1, further comprising:
   communicating with publishers and subscribers of the pub/sub messaging system; and subscribing to topics based on communications from the publishers and subscribers of the pub/sub messaging system.

6. The method of claim 1, further comprising:
   validating a certification chain of a publisher or subscriber of the pub/sub messaging system.

7. The method of claim 1, further comprising:
   notifying a publisher of the pub/sub messaging system that a subscriber of the pub/sub messaging system has not been supplied with new keys during a re-keying procedure.

8. A computer system for a publish/subscribe (pub/sub) messaging system, the computer system comprising:
   a processor set; and
   one or more computer readable storage media;
   wherein: the processor set is structured, located, connected and/or programmed to run program instructions collectively stored on the one or more computer readable storage media; and
   the program instructions include instructions programmed to perform:
      identifying a subscriber of a pub/sub messaging system;
      retrieving a stored encrypted key for the identified subscriber of the pub/sub messaging system;
      communicating the retrieved encrypted key to a user of the pub/sub messaging system;
      implementing end-to-end encryption of messages of the pub/sub messaging system based on key-groups, wherein implementing end-to-end encryption further comprises program instructions programmed to perform:
         negotiating a shared secret with the subscriber; and
         generating an encrypted key for the subscriber, based on the shared secret; and
      responsive to an un-subscription of a first subscriber of the pub/sub messaging system where the un-subscription did not cause a re-keying procedure:
         tracking certificates of ex-subscribers that un-subscribed since a most recent first re-keying procedure was undertaken;
         determining that the first subscriber has become unauthorized; and
         in response to determining that the first subscriber has become unauthorized, initiating a second re-keying procedure that is after the most recent first re-keying procedure was undertaken.

9. The computer system of claim 8, wherein implementing end-to-end encryption further comprises program instructions programmed to perform:
  storing the encrypted key for the subscriber of the pub/sub messaging system.

10. The computer system of claim 8, further comprising program instructions programmed to perform:
  identifying a key-group for a subscriber of the pub/sub messaging system based on a heuristic of the pub/sub messaging system.

11. The computer system of claim 10, wherein the heuristic of the pub/sub messaging system is based on a factor selected from the group consisting of a subscription persistence, a lifetime of an existing subscription, and a lifetime of a previous subscription.

12. The computer system of claim 8, further comprising program instructions programmed to perform:
  communicating with publishers and subscribers of the pub/sub messaging system; and
  subscribing to topics based on communications from the publishers and subscribers of the pub/sub messaging system.

13. The computer system of claim 8, further comprising program instructions programmed to perform:
  validating a certification chain of a publisher or subscriber of the pub/sub messaging system.

14. The computer system of claim 8, further comprising program instructions programmed to perform:
  notifying a publisher of the pub/sub messaging system that a subscriber of the pub/sub messaging system has not been supplied with new keys during a re-keying procedure.

15. A computer program product for a publish/subscribe (pub/sub) messaging system, the computer program product comprising:
  one or more computer readable storage media, and program instructions collectively stored on the one or more computer readable storage media, the program instructions comprising instructions to perform:
    identifying a subscriber of a pub/sub messaging system;
    retrieving a stored encrypted key for the identified subscriber of the pub/sub messaging system;
    communicating the retrieved encrypted key to a user of the pub/sub messaging system;
    implementing end-to-end encryption of messages of the pub/sub messaging system based on key-groups, wherein implementing end-to-end encryption of messages further comprises negotiating a shared secret with the subscriber;
    generating an encrypted key for the subscriber, based on the shared secret; and
    responsive to an un-subscription of a first subscriber of the pub/sub messaging system where the un-subscription did not cause a re-keying procedure:
      tracking certificates of ex-subscribers that un-subscribed since a most recent first re-keying procedure was undertaken;
      determining that the first subscriber has become unauthorized; and
      in response to determining that the first subscriber has become unauthorized, initiating a second re-keying procedure that is after the most recent first re-keying procedure was undertaken.

16. The computer program product of claim 15, wherein:
  the computer program product is a computer system; and
  the computer program product further comprises a processor set structured and/or connected in data communication with the one or more computer readable storage media so that the processor set executes computer instructions collectively stored on the one or more computer readable storage media.

17. A computer-implemented method for a publish/subscribe (pub/sub) messaging system, the method comprising:
  identifying, by a middleware system, a subscriber of the pub/sub messaging system;
  retrieving, by the middleware system, a stored encrypted key for the identified subscriber of the pub/sub messaging system;
  communicating, by the middleware system, the retrieved encrypted key to a user of the pub/sub messaging system;
  implementing, by the middleware system, end-to-end encryption of messages of the messaging system based on key-groups;
  negotiating, by the middleware system, a shared secret with the subscriber;
  generating, by the middleware system, an encrypted key for the subscriber based on the shared secret; and
  responsive to an un-subscription of a first subscriber of the pub/sub messaging system where the un-subscription did not cause a re-keying procedure:
    tracking certificates of ex-subscribers that un-subscribed since a most recent first re-keying procedure was undertaken;
    determining that the first subscriber has become unauthorized; and
    in response to determining that the first subscriber has become unauthorized, initiating a second re-keying procedure that is after the most recent first re-keying procedure was undertaken.

18. The method of claim 17, further comprising:
  storing, by the middleware system, an encrypted key for the subscriber of the pub/sub messaging system.

19. The method of claim 17, further comprising:
  identifying, by the middleware system, a key-group for a subscriber of the pub/sub messaging system based on a heuristic of the pub/sub messaging system.

20. The method of claim 19, wherein the heuristic of the pub/sub messaging system is based on a factor selected from the group consisting of a subscription persistence, a lifetime of an existing subscription, and a lifetime of a previous subscription.

21. A computer-implemented method for a publish/subscribe (pub/sub) messaging system, the method comprising:
  identifying, by a key management system, a subscriber of the pub/sub messaging system;
  retrieving, by the key management system, from a key storage component, an encrypted key for the identified subscriber of the pub/sub messaging system;
  communicating, by the key management system, the retrieved encrypted key to a user of the pub/sub messaging system;
  implementing, by the key management system, end-to-end encryption of messages of the messaging system based on key-groups;
  negotiating, by the key management system, a shared secret with the subscriber;
  generating, by the key management system, an encrypted key for the subscriber, based on the shared secret; and responsive to an un-subscription of a first subscriber of the pub/sub messaging system where the un-subscription did not cause a re-keying procedure:

tracking certificates of ex-subscribers that un-subscribed since a most recent first re-keying procedure was undertaken;

determining that the first subscriber has become unauthorized; and in response to determining that the first subscriber has become unauthorized, initiating a second re-keying procedure that is after the most recent first re-keying procedure was undertaken.

22. The method of claim 21, wherein implementing end-to-end encryption further comprises:

storing, by the key management system, the encrypted key for the subscriber of the pub/sub messaging system.

23. The method of claim 21, further comprising:

identifying, by the key management system, a key-group for a subscriber of the pub/sub messaging system based on a heuristic of the pub/sub messaging system, wherein the heuristic of the pub/sub messaging system is based on a factor selected from the group consisting of a subscription persistence, a lifetime of an existing subscription, and a lifetime of a previous subscription.

* * * * *